United States Patent
Brobston et al.

(10) Patent No.: US 7,493,141 B2
(45) Date of Patent: *Feb. 17, 2009

(54) COMMON RADIO ARCHITECTURE FOR MULTI-MODE MULTI-BAND APPLICATIONS

(75) Inventors: Michael L. Brobston, Allen, TX (US); Seong E. Kim, Plano, TX (US); Lup M. Loh, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 514 days.

This patent is subject to a terminal disclaimer.

(21) Appl. No.: 11/057,459

(22) Filed: Feb. 14, 2005

(65) Prior Publication Data

US 2005/0202842 A1 Sep. 15, 2005

Related U.S. Application Data

(60) Provisional application No. 60/553,104, filed on Mar. 15, 2004.

(51) Int. Cl.
*H04B 1/10* (2006.01)
*H04M 1/00* (2006.01)

(52) U.S. Cl. .................. 455/552.1; 455/285; 455/302

(58) Field of Classification Search ............ 455/552.1, 455/550.1, 73, 575.7, 132, 136, 150.1, 183.1, 455/188.1, 343.1, 574, 418, 285, 302
See application file for complete search history.

(56) References Cited

U.S. PATENT DOCUMENTS

| | | | |
|---|---|---|---|
| 6,483,456 B2* | 11/2002 | Huisken | 342/357.06 |
| 6,751,470 B1* | 6/2004 | Ella et al. | 455/552.1 |
| 6,799,028 B2* | 9/2004 | Bauer | 455/321 |
| 6,895,063 B1* | 5/2005 | Cowley et al. | 375/376 |
| 6,909,885 B2* | 6/2005 | Kennedy et al. | 455/289 |
| 7,196,739 B2* | 3/2007 | Coe et al. | 348/731 |
| 7,236,760 B2* | 6/2007 | Cowley et al. | 455/302 |
| 2006/0121937 A1* | 6/2006 | Son | 455/553.1 |
| 2006/0189286 A1* | 8/2006 | Kyu et al. | 455/144 |
| 2006/0205376 A1* | 9/2006 | Brobston et al. | 455/280 |
| 2007/0032238 A1* | 2/2007 | Kim et al. | 455/436 |
| 2007/0243832 A1* | 10/2007 | Park et al. | 455/73 |

* cited by examiner

*Primary Examiner*—Sonny Trinh

(57) ABSTRACT

A multi-mode, multi-band mobile station for use in wireless networks operating under different air interface standards. The present invention, the mobile station comprises a plurality of low-noise amplifiers. Each of the plurality of low-noise amplifiers is optimized for use in a selected frequency band. The mobile station also comprises a near-zero intermediate frequency (NZIF) broadband image rejection mixer for receiving an amplified RF signal from a selected one of the plurality of low-noise amplifiers and down-converting the amplified RF signal to produce a first analog intermediate frequency (IF) signal.

20 Claims, 3 Drawing Sheets

COMMON RADIO ARCHITECTURE FOR MULTI-MODE MULTI-BAND APPLICATIONS

CROSS-REFERENCE TO RELATED APPLICATIONS

The present invention is related to that disclosed in U.S. Provisional Patent Application Ser. No. 60/553,104, filed Mar. 15, 2004, entitled "Common Radio Architecture for Multi-Mode/Multi-Band Applications". U.S. Provisional Patent Application Ser. No. 60/553,104 is assigned to the assignee of the present application. The subject matter disclosed in U.S. Provisional Patent Application Ser. No. 60/553,104 is hereby incorporated by reference into the present disclosure as if fully set forth herein. The present invention hereby claims priority under 35 U.S.C. §119(e) to U.S. Provisional Patent Application Ser. No. 60/553,104.

TECHNICAL FIELD OF THE INVENTION

The present invention relates generally to wireless networks and, more specifically, to a multi-mode, multi-band mobile station for use in a wireless network.

BACKGROUND OF THE INVENTION

Recent years have seen the deployment of a variety of different access standards for use in wireless networks (e.g., GSM, CDMA, WCDMA, IEEE-801.16, etc.). However, the proliferation of wireless access standards has proven to be inconvenient and challenging for the manufacturers of wireless mobile stations (or terminal), such as cell phones, PDA devices, wireless laptops, and the like. End-user expectations of a ubiquitous network cannot be met with mobile stations that support only a subset of the possible standards.

In response, wireless mobile stations are transitioning to software-defined radio (SDR) architectures to provide common hardware platforms for multiple air interface technologies. The continual improvement of semiconductor process technology has enabled an increasingly greater percentage of the signal processing functions in a mobile station (or wireless terminal) to be performed by reconfigurable hardware. The reconfigurable hardware may take one of several forms, including fixed functional blocks with customizable parameters and flexible interconnects. The reconfigurable hardware may be implemented, for example, in a field-programmable gate array (FPGA).

SDR designs must always be cognizant of factors such as current consumption and low component count in order to conserve board space, material cost, and battery life. At the same time, the desire to achieve a roaming capability among different standards requires an SDR receiver to perform faster searches and handoffs. However, the need for faster processing generally requires higher power. The use of field programmable gate arrays (FPGAs) enables SDR devices to perform digital signal processing (DSP) functions at very high speed while consuming lower power than a traditional DSP processor. However, the general trend is that current consumption increases as speed increases.

The state of wireless mobile station development has been that different wireless standards required different hardware. Conventional receiver designs use a zero-intermediate-frequency (ZIF) architecture in which the entire receiver front-end is implemented using analog components. Such a configuration makes it impractical for the receiver to measure the received signal strength for use by the baseband modem. Also, in conventional ZIF architectures, the direct down-converter is a narrowband device that is unsuitable for broadband applications. Other receiver designs digitize at IF frequencies, which results in higher current (i.e., power) requirements. The implementation of configurable hardware for conventional analog-to-digital components at higher frequencies proved too demanding on the current consumption budget.

Therefore, there is a need in the art for a mobile station that implements reconfigurable hardware components in the receiver front-end. In particular, there is a need for a receiver in which reconfigurable components are used prior to the conversion to digital signals at IF level.

SUMMARY OF THE INVENTION

The present invention provides an apparatus for reducing the power consumption of the soft-ware defined radio (SDR) processing elements in a multi-mode, multi-band mobile station. The present invention accomplishes this using a Near Zero-Intermediate Frequency (NZIF) radio-frequency (RF) receiver front-end configuration that achieves a lower intermediate frequency (IF) and reduces the processing rate of the digital intermediate frequency (DIF) receiver component. The NZIF RF receiver provides a lower sampling rate at IF, while maintaining the digital signal processing functions at the IF level.

The present invention exploits a broad bandwidth image reject mixer design in the RF analog front-end of the receiver to cater to multiple frequency bands at lower current consumption. The present invention also exploits the configurability of the digital IF filters and operating the digital IF sections at lower sampling rates, thereby lowering current consumption.

To address the above-discussed deficiencies of the prior art, it is a primary object of the present invention to provide a multi-mode, multi-band mobile station for use in wireless networks operating under different air interface standards. According to an advantageous embodiment of the present invention, the mobile station comprises: 1) a plurality of low-noise amplifiers, wherein each of the plurality of low-noise amplifiers is optimized for use in a selected frequency band; and a near-zero intermediate frequency (NZIF) broadband image rejection mixer capable of receiving an amplified RF signal from a selected one of the plurality of low-noise amplifiers and down-converting the amplified RF signal to produce a first analog intermediate frequency (IF) signal.

According to one embodiment of the present invention, the multi-mode, multi-band mobile station further comprises a switch for coupling the selected low-noise amplifier to the NZIF broadband image rejection mixer.

According to another embodiment of the present invention, the switch selects the selected low noise amplifier according to a first air interface standard under which the multi-mode, multi-band mobile station operates.

According to still another embodiment of the present invention, the multi-mode, multi-band mobile station further comprises a programmable frequency synthesizer capable of supplying oscillator reference signals at selectable frequencies to the NZIF broadband image rejection mixer.

According to yet another embodiment of the present invention, the multi-mode, multi-band mobile station further comprises a first re-configurable bandpass filter for filtering the first analog IF signal from the NZIF broadband image rejection mixer.

According to a further embodiment of the present invention, the first re-configurable bandpass filter filters the first analog IF signal according to the first air interface standard under which the multi-mode, multi-band mobile station operates.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
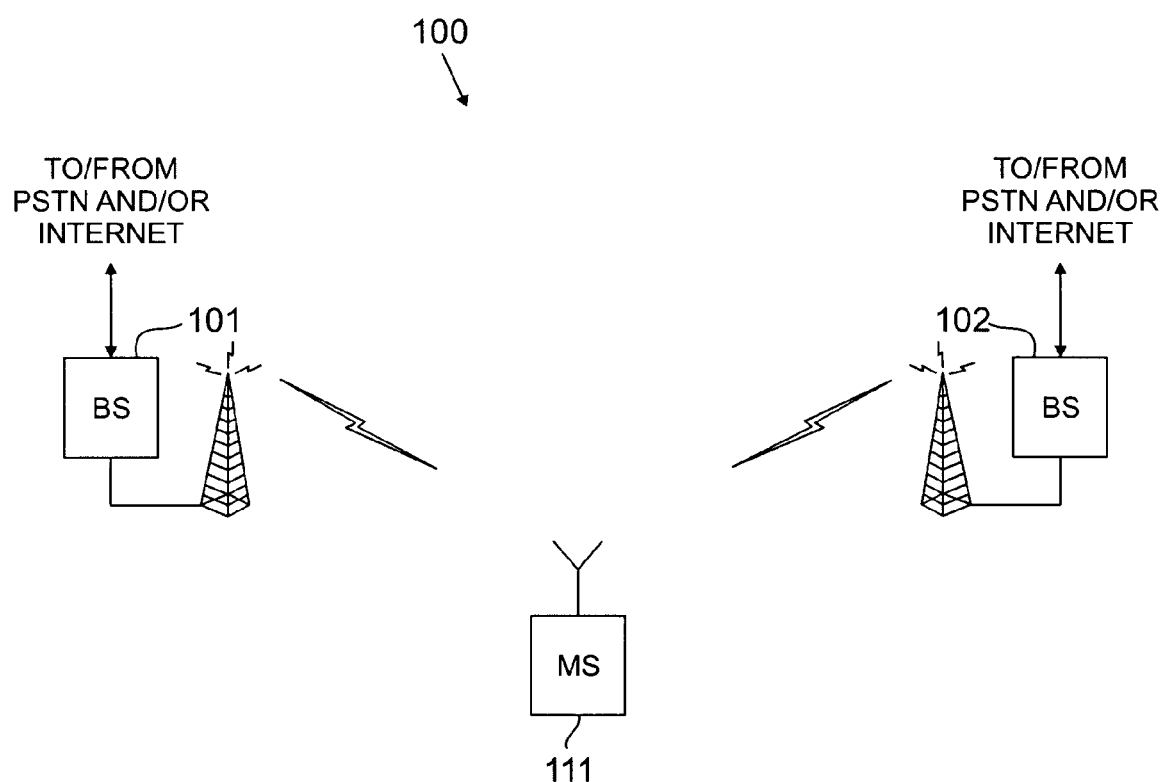
FIG. 1 illustrates wireless communication system in which a multi-mode, multi-band mobile station may communicate with base stations operating under different air interface standards.
Figure 2:
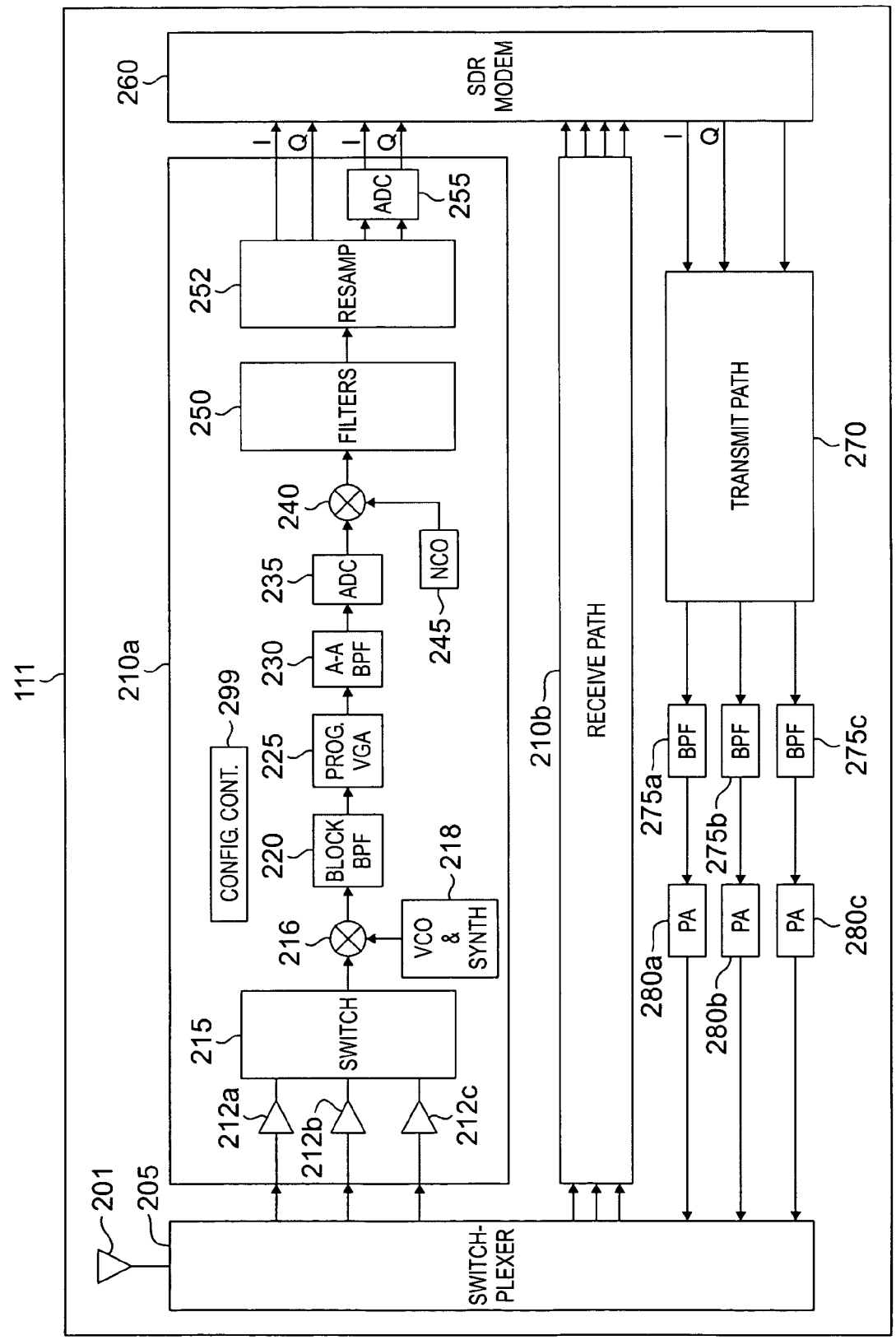
FIG. 2 illustrates the multi-mode, multi-band mobile station in FIG. 1 according to an exemplary embodiment of the present invention.
Figure 3:
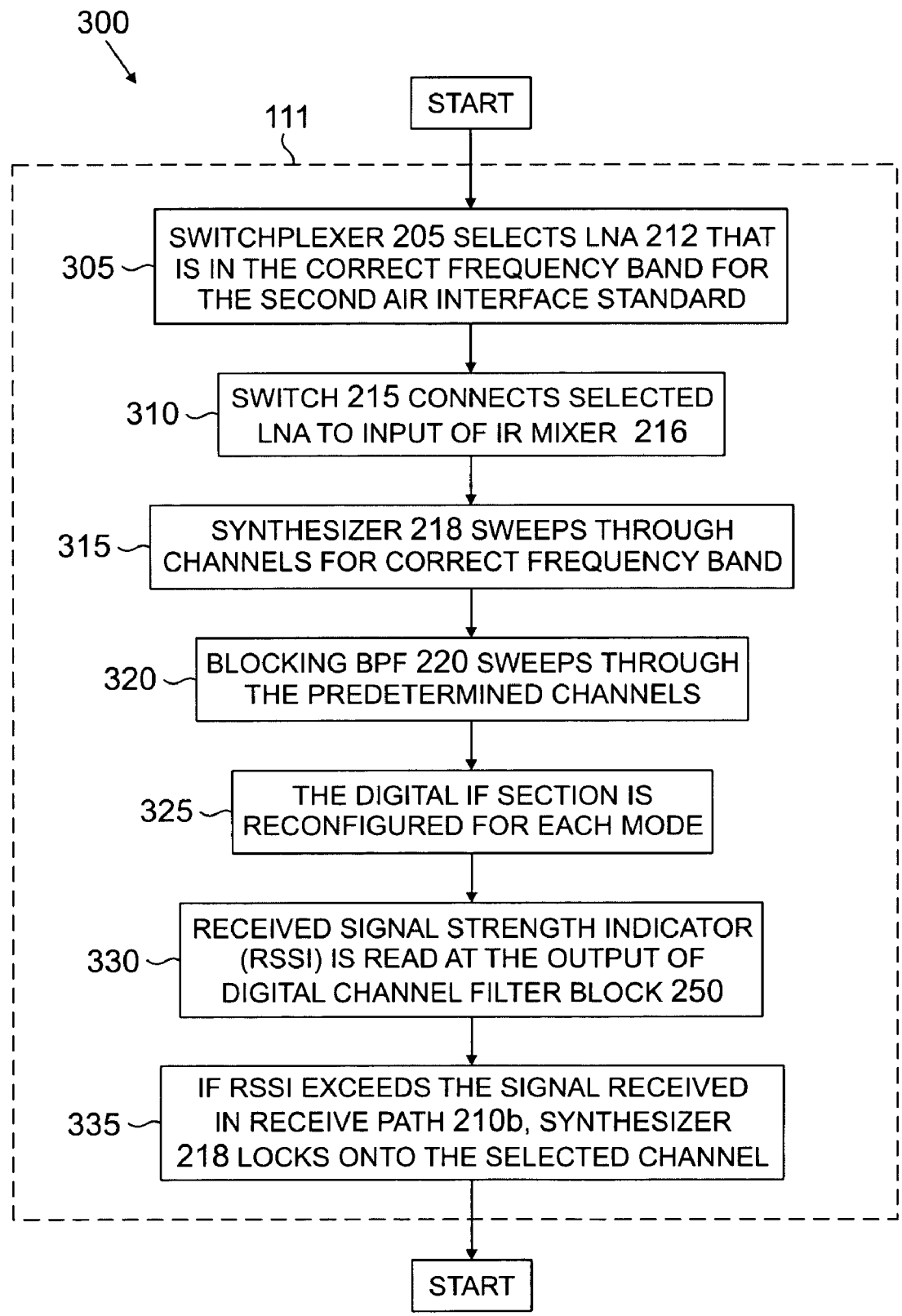
FIG. 3 is a flow diagram illustrating a search mode operation by the exemplary wireless mobile station according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged multi-mode, multi-band mobile station.

FIG. 1 illustrates wireless communication system 100, in which multi-mode, multi-band mobile station (or wireless terminal) 111 may communicate with base stations operating under different air interface standards. In FIG. 1, it is assumed that base station 101 is part of a first wireless network operating according to a first air interface standard (e.g., CDMA2000 in this example). It is further assumed that base station 102 is part of a second wireless network operating according to a second air interface standard (e.g., GSM in this example). Mobile station (MS) 111 may be configured by a first software load to communicate with BS 101 and may be re-configured by a second software load to communicate with BS 102. The software loads may be selected manually by user inputs or automatically by the detection of signals from BS 101 and BS 102.

The present invention is not limited to use with truly mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

FIG. 2 illustrates multi-mode, multi-band mobile station 111 according to an exemplary embodiment of the present invention. Mobile station 111 comprises antenna array 201, switchplexer 205, re-configurable receive path 210a, re-configurable receive path 210b, and re-configurable software-defined radio (SDR) modem block 260. SDR modem block 260 is typically a general-purpose device or a semi-custom device that can essentially change characteristics based on a new software load. Mobile station 111 further comprises transmit path 270 and a plurality of band pass filters 275, including exemplary band pass filter (BPF) 275a, exemplary band pass filter (BPF) 275b, and exemplary band pass filter (BPF) 275c. Finally, mobile station 111 comprises a plurality of power amplifiers 280, including exemplary power amplifier 280a, exemplary power amplifier 280b, and exemplary power amplifier 280c.

The present invention implements dual identical receive paths in order to perform more efficient searching algorithm, thereby facilitating roaming operation. Thus, as the user moves between regions that support different wireless standards, the same mobile station may be used. The dual receive path architecture also permits remote reconfiguration of the intermediate frequency (IF) filters and the digital intermediate frequency. Because re-configurable receive path 210a and re-configurable receive path 210b are substantially identical, only re-configurable receive path 210a is shown in detail. However, the following descriptions of re-configurable receive path 210a apply with equal force to re-configurable receive path 210b.

Re-configurable receive path 210a comprises an input stage of selectable low-noise amplifiers (LNAs) 212, switch 215, broadband image rejection (IR) mixer 216, voltage-controlled oscillator (VCO) and frequency synthesizer block 218, configurable blocking bandpass filter (BPF) 220, programmable variable gain amplifier (VGA) 225, and configurable anti-alias bandpass filter (BPF) 230. Re-configurable receive path 210a further comprises programmable analog-to-digital converter (ADC) 235, intermediate frequency (IF) mixer 240, numerically-controlled oscillator (NCO) 245, digital channel filter block 250, resampler 252 and digital-to-analog converter (DAC) 255 and configuration controller 299.

Configuration controller 299 is responsible for controlling the configuration of receive path 210a. Depending on the air interface selected, configuration controller 299 transmits commands and/or configuration parameters to the re-configurable blocks in receive path 210a to cause re-configuration of those devices. For the purpose of simplicity, connection lines between configuration controller 299 and the other components of receive path 210a are not shown.

The input stage of selectable low-noise amplifiers (LNAs) 212 includes exemplary low-noise amplifier (LNA) 212a, exemplary low-noise amplifier (LNA) 212b, and exemplary low-noise amplifier (LNA) 212c. The input stage of selectable low-noise amplifiers (LNAs) 212 receives incoming RF signals from switchplexer 205. Each one of LNA 212a, LNA 212b, and LNA 212c is optimized to amplify RF signals in a selected frequency range. For example, selectable LNA 212a may amplify signals in the 2.0-2.1 GHz range with minimum power consumption, selectable LNA 212b may amplify signals in the 1800-1900 MHz range with minimum power consumption, and selectable LNA 212c may amplify signals in the 860-960 MHz range with minimum power consumption. The use of LNAs optimized for certain frequency bands enhances the multi-mode, multi-band capabilities of mobile station 111.

Switch 215 selects the output of only one of the selectable LNAs to be applied to the input of broadband image rejection (IR) mixer 216. To reduce power consumption, a low-noise amplifier that is not selected by switch 215 may be turned off. Broadband image rejection (IR) mixer 216 receives programmable reference signals from VCO and frequency synthesizer block 218 and down-converts the selected RF signal from switch 215 to an intermediate frequency (IF) level of, for example, 10 MHz. Broadband image rejection (IR) mixer 216 performs a Near-Zero-IF (NZIF) down-conversion. In the exemplary embodiment, image rejection comes solely from broadband IR mixer 216.

The IF output of broadband IR mixer 216 is filtered by configurable blocking BPF 220 to remove interferers. Programmable variable gain amplifier (VGA) 225 adjusts the IF signal level to an optimized predetermined level for ADC 235, after further filtering by configurable anti-alias bandpass filter (BPF) 230. In an exemplary embodiment, ADC 235 samples the IF signal at 40 megasamples per second (Msps).

The digital IF samples from ADC 235 are then down-converted to baseband by IF mixer 240 and NCO 245. The baseband in-phase (I) and quadrature (Q) outputs of IF mixer 240 are filtered in digital channel filter block 250. The filtered baseband I and Q signals are then resampled by resampler 252 to match the rate of SDR modem 260. If SDR modem accepts analog inputs, DAC 255 converts the digital I and Q signals to analog.

The Near-Zero-IF (NZIF) down-conversion allows a low sample rate digital IF (DIF) design for current conservation. Broadband IR mixer 216 is a high-linearity mixer that is a critical block in the RF design. This novel architecture allows the receiver to perform DSP functions, such as RSSI measurements for searching functions, while optimizing the current consumption.

FIG. 3 depicts flow diagram 300, which illustrates a search mode operation by wireless mobile station 111 according to an exemplary embodiment of the present invention. It is assumed that receive path 210b is currently receiving a signal according to a first air interface standard. Receive path 210a then searches for a signal in a second air interface standard based on an established search algorithm. Switchplexer 205 selects the input of one of low-noise amplifiers 212a-c that is in the correct frequency band for the second air interface standard (process step 305). Next, switch 215 connects the output of the selected LNA to the input of broadband IR mixer 216 (process step 310). VCO and frequency synthesizer 218 then sweeps through the channels for the correct frequency band according to the search algorithm (process step 315). Blocking BPF 220 also is configured to sweep through the predetermined channel bandwidths (process step 320).

The digital IF section (i.e., IF mixer 240, NCO 245, filter block 250, resampler 252 and DAC 255) is reconfigured for each mode (e.g., GSM, GPRS, EDGE, CDMA, WCDMA, 802.11, etc.) (process step 325). The received signal strength indicator (RSSI) is available at the output of digital channel filter block 250 (process step 330). Once it is determined that the signal strength at the output of digital channel filter block 250 exceeds the signal received in receive path 210b, VCO and frequency synthesizer 218 locks onto the selected channel (process step 335). Modem 260 performs mode identification and reconfigures anti-alias BPF 230.

Although the present invention has been described with an exemplary embodiment, various changes and modifications may be suggested to one skilled in the art. It is intended that the present invention encompass such changes and modifications as fall within the scope of the appended claims.

What is claimed is:

1. A multi-mode, multi-band mobile station for use in wireless networks operating under different air interface standards, the mobile station comprising:
   a plurality of low-noise amplifiers, wherein each of said plurality of low-noise amplifiers is optimized for use in a selected frequency band; and
   a near-zero intermediate frequency (NZIF) broadband image rejection mixer capable of receiving an amplified RF signal from a selected one of said plurality of low-noise amplifiers and down-converting said amplified RF signal to produce a first analog intermediate frequency (IF) signal.

2. The multi-mode, multi-band mobile station as set forth in claim 1, further comprising a switch for coupling said selected low-noise amplifier to said NZIF broadband image rejection mixer.

3. The multi-mode, multi-band mobile station as set forth in claim 2, wherein said switch selects said selected low noise amplifier according to a first air interface standard under which said multi-mode, multi-band mobile station operates.

4. The multi-mode, multi-band mobile station as set forth in claim 3, further comprising a programmable frequency synthesizer capable of supplying oscillator reference signals at selectable frequencies to said NZIF broadband image rejection mixer.

5. The multi-mode, multi-band mobile station as set forth in claim 4, further comprising a first re-configurable bandpass filter for filtering said first analog IF signal from said NZIF broadband image rejection mixer.

6. The multi-mode, multi-band mobile station as set forth in claim 5, wherein said first re-configurable bandpass filter filters said first analog IF signal according to said first air interface standard under which said multi-mode, multi-band mobile station operates.

7. The multi-mode, multi-band mobile station as set forth in claim 6, wherein said first re-configurable bandpass filter removes unwanted frequencies from said first analog IF signal.

8. The multi-mode, multi-band mobile station as set forth in claim 7, further comprising a programmable variable gain amplifier capable of amplifying a first filtered analog IF signal from said first re-configurable bandpass filter.

9. The multi-mode, multi-band mobile station as set forth in claim 8, further comprising a second re-configurable bandpass filter for filtering an amplified analog IF signal from said programmable variable gain amplifier.

10. The multi-mode, multi-band mobile station as set forth in claim 9, wherein said second re-configurable bandpass filter is an anti-alias filter.

11. The multi-mode, multi-band mobile station as set forth in claim 10, further comprising an analog-to-digital converter capable of converting a second filtered IF signal from said second re-configurable bandpass filter to a digital IF signal.

12. The multi-mode, multi-band mobile station as set forth in claim 11, wherein said programmable variable gain amplifier amplifies said first filtered analog IF signal according to an operating range of said analog-to-digital converter.

13. The multi-mode, multi-band mobile station as set forth in claim 12, further comprising a reconfigurable digital IF processing block.

14. A method of operating a multi-mode, multi-band mobile station for use in wireless networks operating under different air interface standards, the method comprising the steps of:
  selecting one of a plurality of low-noise amplifiers to amplify an incoming radio-frequency (RF) signal, wherein each of the plurality of low-noise amplifiers is optimized for use in a selected frequency band; and
  down-converting an amplified RE signal from the selected low-noise amplifier in a near-zero intermediate frequency (NZIF) broadband image rejection mixer to produce a first analog intermediate frequency (IF) signal.

15. The method as set forth in claim 14, further comprising the step of coupling the selected low-noise amplifier to the NZIF broadband image rejection mixer using a switch.

16. The method as set forth in claim 15, wherein the switch selects the selected low noise amplifier according to a first air interface standard under which the multi-mode, multi-band mobile station operates.

17. The method as set forth in claim 16, wherein the NZIF broadband image rejection mixer receives oscillator reference signals at selectable frequencies from a programmable frequency synthesizer.

18. The method as set forth in claim 17, further comprising the step of filtering the first analog IF signal from the NZIF broadband image rejection mixer in a first re-configurable bandpass filter.

19. The method as set forth in claim 18, wherein the first re-configurable bandpass filter filters the first analog IF signal according to the first air interface standard under which the multi-mode, multi-band mobile station operates.

20. The method as set forth in claim 19, wherein the first re-configurable bandpass filter removes unwanted frequencies from the first analog IF signal.

* * * * *

UNITED STATES PATENT AND TRADEMARK OFFICE
CERTIFICATE OF CORRECTION

PATENT NO. : 7,493,141 B2 Page 1 of 1
APPLICATION NO. : 11/057459
DATED : February 17, 2009
INVENTOR(S) : Michael L. Brobston, Seong E. Kim and Lup M. Loh It is certified that error appears in the above-identified patent and that said Letters Patent is hereby corrected as shown below:

Column 7, claim 14, line 14, delete "RE" and replace with --RF--.

Signed and Sealed this

Twelfth Day of January, 2010

David J. Kappos
*Director of the United States Patent and Trademark Office*